June 9, 1959
H. J. SHAFER
2,890,017
VALVE CONSTRUCTED OF PRE-FORMED TUBES
AND METHOD OF MAKING SAME
Filed Jan. 24, 1956
3 Sheets-Sheet 1
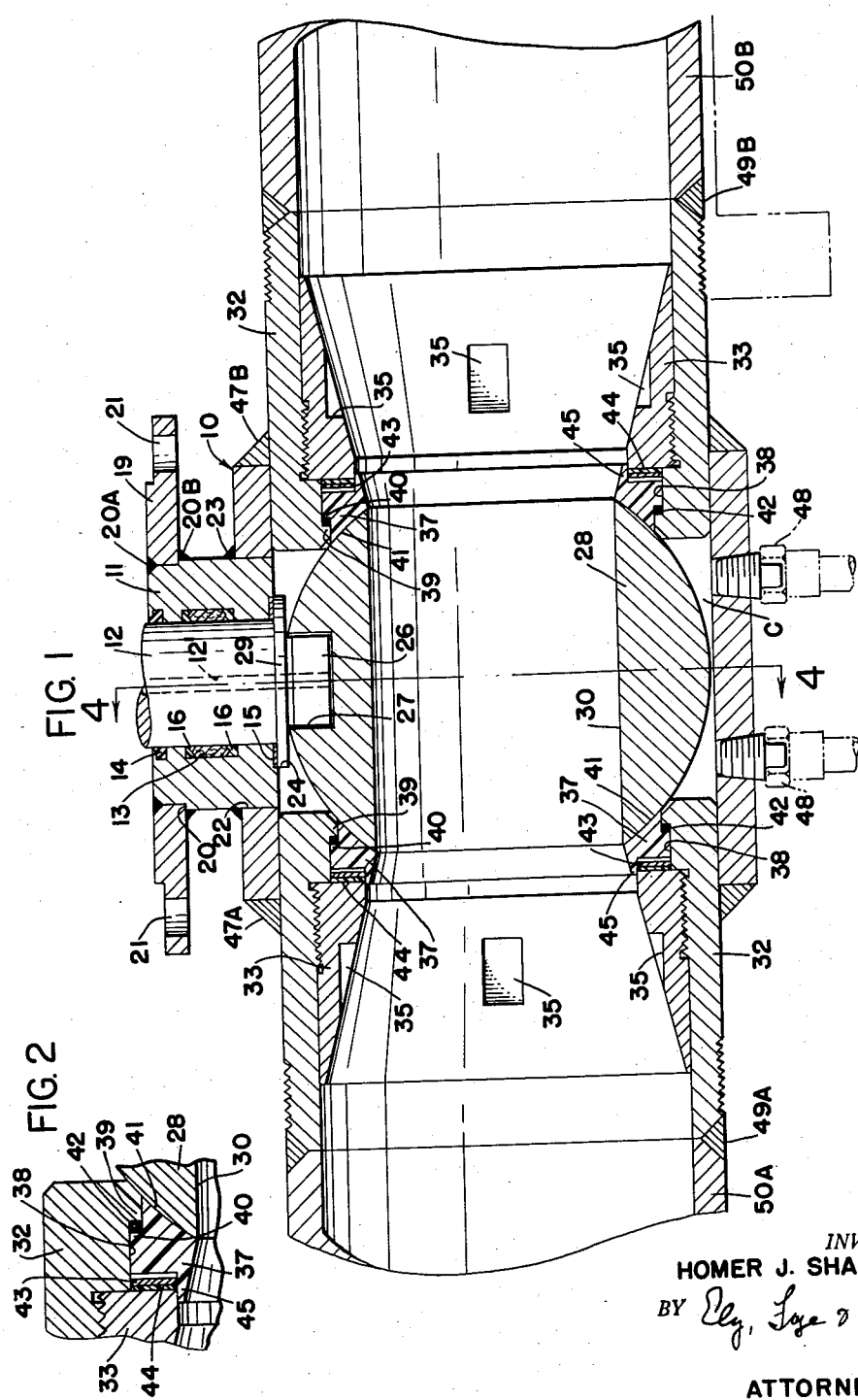
INVENTOR.
HOMER J. SHAFER
BY
ATTORNEYS June 9, 1959
H. J. SHAFER
2,890,017
VALVE CONSTRUCTED OF PRE-FORMED TUBES
AND METHOD OF MAKING SAME
Filed Jan. 24, 1956
3 Sheets-Sheet 2
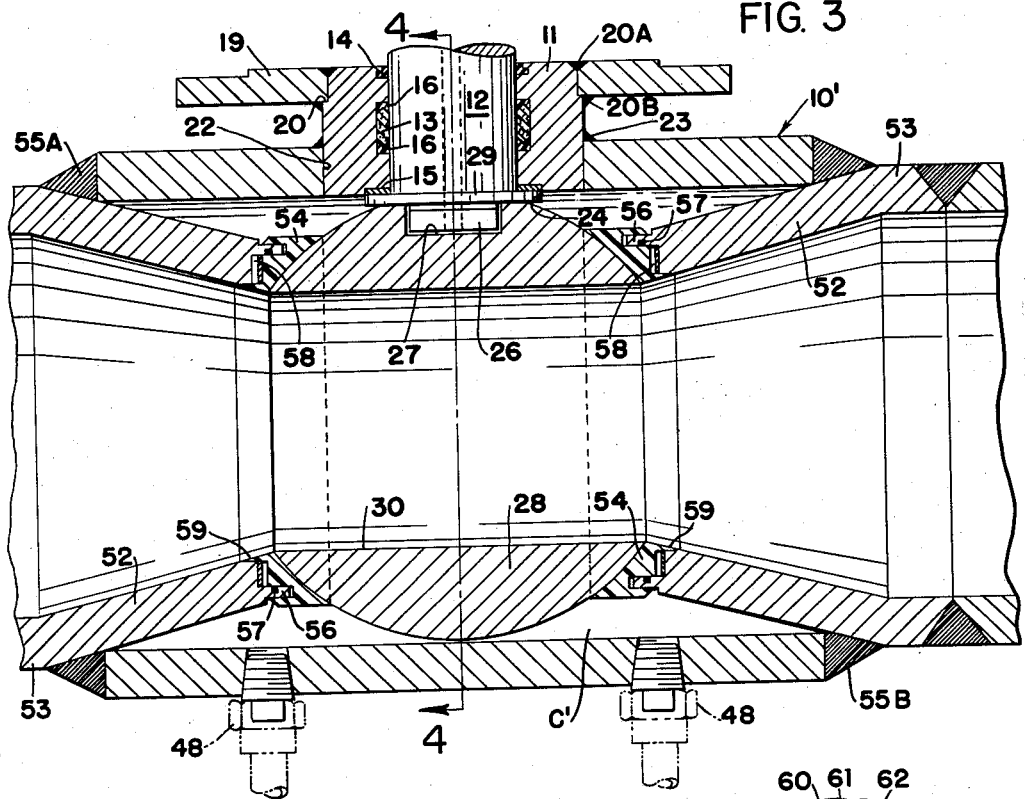
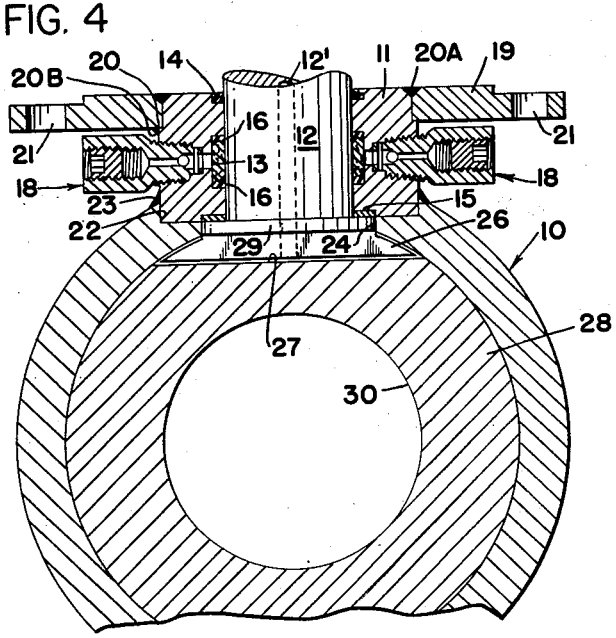
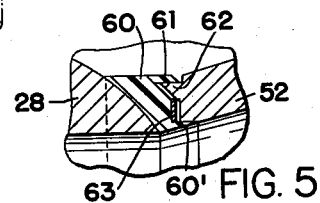
FIG. 5
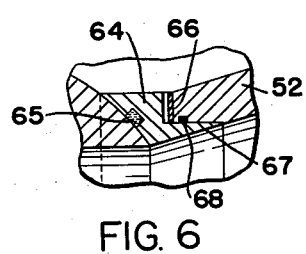
FIG. 6
INVENTOR.
HOMER J. SHAFER
BY *Oly, Frye & Hamilton*
ATTORNEYS June 9, 1959

H. J. SHAFER 2,890,017

VALVE CONSTRUCTED OF PRE-FORMED TUBES
AND METHOD OF MAKING SAME

Filed Jan. 24, 1956

*INVENTOR.*
HOMER J. SHAFER

BY *Ely, Frye & Hamilton*

ATTORNEYS

United States Patent Office 2,890,017
Patented June 9, 1959

2,890,017

VALVE CONSTRUCTED OF PRE-FORMED TUBES AND METHOD OF MAKING SAME

Homer J. Shafer, Mansfield, Ohio, assignor to Shafer Valve Company, Mansfield, Ohio, a corporation of Ohio Application January 24, 1956, Serial No. 560,977

10 Claims. (Cl. 251—174)

The invention relates generally to the construction of valves such as are used in high pressure pipe lines, and more particularly to the construction of a ball valve having a housing or body made entirely from preformed tubes of steel or wrought metal.

Conventional valve bodies are usually cast, and requirements for high pressure operation are met by making the casting extra heavy for added strength. However, such heavy castings are very expensive to make, handle and transport. Moreover, in addition to the material and fabrication cost, the cost of machining such castings is very high.

Forged steel bodies have been proposed for improving the strength-to-weight ratio, but the tremendous cost of the forging equipment and the forging and subsequent machining operations make it commercially impracticable to make forged valves in anything but the smaller sizes of the order of six-inch valves or less.

I am familiar with U.S. Letters Patent No. 2,034,418, issued March 17, 1936, to L. G. Plant, which discloses a method of fabricating gate valves from pre-formed wrought metal tubes, but this method is limited to making gate valves, which require a side recess into which the tapered gate can be withdrawn clear of the opposed ports to allow free fluid flow when the valve is open, and flange means are provided beyond said recess for detachably mounting the valve stem and bonnet and permitting insertion or removal of the gate after the valve body has been welded together. The patented method requires eleven or twelve separate operations. Further, the patent recognizes that the heat generated by the welding operations is apt to warp or otherwise damage critical parts of the valve such as the seats, and resorts to immersing substantially all of the valve, or the part being welded, in water or other cooling medium during the various welding operations.

The method of Patent No. 2,034,418 is not intended nor adapted for fabricating ball valves because in valves of this type the ball is enclosed in sealing rings on opposite sides thereof, and cannot be inserted through a side tube after the housing parts are assembled and welded together into an integral valve body. Conventional ball valves have cast or forged bodies made in two or more parts screwed or otherwise detachably connected together, so that they can be assembled around the ball after it is positioned within its sealing rings.

The purpose of the present invention is to provide a ball valve having a body of steel tube construction in which the ball is accurately positioned and aligned during fabrication and requires no detachable means for assembling, inserting or removing the ball.

Another object is to simplify the construction of valve bodies constructed from pre-formed steel tubes, and to provide an improved method of fabricating said valve bodies.

Another object is to provide an improved welded steel tube valve body construction which embodies a sealed chamber surrounding the ball and utilizable first as a cooling jacket for the final welding operation with the ball and its seal in place, and later as a lubricant chamber.

A further object is to provide an improved ball valve having a steel tube body in which the ball floats in closed position between resilient sealing rings and the line pressure is distributed over the downstream seal.

The invention utilizes pre-formed steel tubes of standard sizes and shapes, and provides a simple lightweight and strong construction suitable for use in high pressure lines, and which is fabricated rapidly and economically.

These and other objects are accomplished by the improvements comprising the present invention, preferred embodiments of which are hereinafter disclosed and described by way of example. Various modifications and changes in details of construction are comprehended within the scope of the appended claims.

The improved ball valve construction comprises an outer center tube coaxial with the flow line and having a valve stem which is journaled at right angles to the outer tube axis in a sealing gland welded into said outer tube, the stem having an inwardly projecting end onto which the tubular ball valve is slidably keyed by inserting the ball turned to closed position through the end of the outer tube, and inner tubes telescoped within and secured to opposite ends of said outer tube, said inner tubes holding ring seals under pressure against opposite ends of the ball and forming an annular chamber between said seals and the outer tube.

Referring to the drawings forming part hereof;

Fig. 1 is a longitudinal sectional view of a preferred embodiment of the improved ball valve construction welded in position in a pipe line, showing the valve in open position.

Fig. 2 is an enlarged fragmentary section of the sealing ring construction in Fig. 1.

Fig. 3 is a view similar to Fig. 1 showing a modified form of valve construction.

Fig. 4 is a transverse sectional view on line 4—4 of Figs. 1 and 3.

Fig. 5 is an enlarged fragmentary section showing a modified form of sealing construction for the form of Fig. 3.

Fig. 6 is a similar view of another modified form of sealing construction for the form of Fig. 3.

Figure 7:
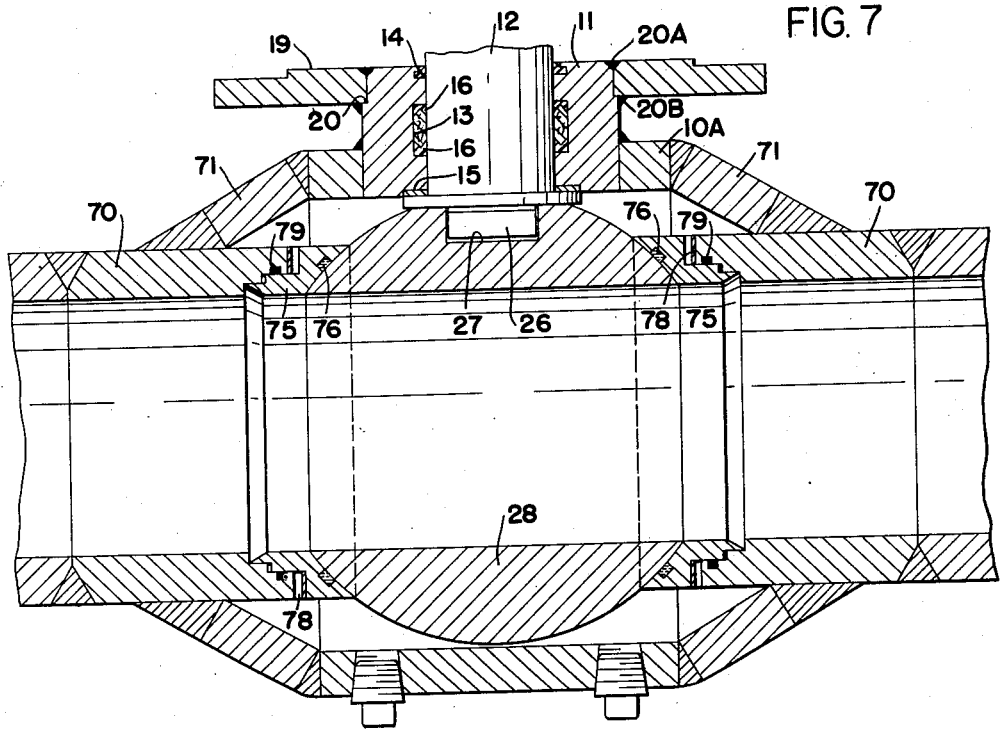
Fig. 7 is a longitudinal sectional view of another modified ball valve construction having a sealing construction similar to that in Fig. 6.

Referring first to Figs. 1–4, the outer tube forming the central part of the valve body is a straight cylindrical tube pre-formed of steel, and its axis is the flow axis of the valve. In Fig. 1, the outer tube is indicated at 10, and in Fig. 3 the outer tube is somewhat longer and is indicated at 10'. The tube 11 in which the valve stem 12 is journaled is preferably a tube made from a cylindrical slug of steel, and has an inner annular groove 13 machined therein for containing a sealing gland, an L-shaped groove at its outer end for receiving a wiper ring 14, and an annular recess at its other end for receiving a bearing ring 15.

The sealing land may comprise channel-shaped rings 16 of neoprene or similar resilient material fitting in the ends of the groove 13 with a fluid sealing compound injected between the rings 16 under pressure through suitable fittings indicated at 18 in Fig. 4. The wiper ring 14 may also be of neoprene and the like. The bearing ring 15 is preferably of bearing material such as bronze.

The tube 11 preferably has an annular mounting plate 19 fitting into an annular recess 20 around one end, with the outer surface of the mounting plate flush with the adjoining end surface of the tube 11. The plate 19 may be welded on both sides of the tube 11 by annular weldments 20A and 20B, and this is done preferably before drilling the bore therein for journaling the valve stem 12. This mounting plate 19 is adapted to support valve operating mechanism having a rotor or other driving means operatively connected to the valve stem 12, and the rim of the plate may be rabbeted as shown and provided with holes 21 for mounting bolts.

The bearing ring 15 is recessed into the inner end of the tube 11, and the tube is mounted on the side wall of either outer tube 10 or 10' medially of its ends, with the axis of tube 11 at right angles to the axis of tube 10 or 10'. This may be done by first machining a circular recess 22 in tube 10, for example, the bottom of said recess along its longitudinal centerline being preferably tangent to the inner cylindrical surface of the tube 10. The cylindrical slug from which tube 11 is formed is then set in the recess 22 and welded in place by the annular weldment 23. An inner cylindrical recess 24 conforming to the bearing ring 15 may be formed in the tube 10 for a purpose to be described.

After the slug and plate 19 assembly has been welded in the recess 22, the bore for the stem 12 is drilled in the slug to form the tube 11 with its axis exactly at right angles to and intersecting the axis of the tube 10. The sealing groove 13 and the groove for the wiper ring 14 are then formed in the bore and the rings 16 and 14 inserted therein.

The valve stem 12 may now be inserted in the bore of tube 11 and this is done from inside the tube 10 because the inner end of the stem has a key 26 thereon which is slidable with a slight clearance into a keyway 27 in the top of the ball shut-off 28. Preferably, an annular rib 29 connects the key 26 to the inner end of the stem 12, and the rib is received in the recess 24 and bears against the bearing ring 15. The shaft 12 is preferably provided with an axial bore 12' for conducting lubricant into the bottom of the keyway 27.

The ball shut-off 28 is tubular and has a cylindrical flow passage 30 extending therethrough. As shown, the keyway 27 extends at right angles to the axis of the flow passage 30, so that when the ball is in open position the keyway 27 runs transversely of the valve body, and when the ball is in closed position the keyway runs longitudinally of the valve body. Thus, to assemble the ball on the stem after the stem is inserted, the stem is turned with its key 26 extending longitudinally of the tube 10 and the ball is inserted into one end of the tube with the keyway 27 also extending longitudinally so as to slidably receive the key 26. The ball is then turned 90° to the open position of Figs. 1 and 3 by turning the stem 12. The manner of mounting the valve stem on outer tube 10' and assembling the ball thereon is identical with that described for the outer tube 10.

The inner tubes are now inserted or telescoped into opposite ends of the outer tube and aligned with the flow passage 30 of the ball. In the case of the valve shown in Fig. 1, the two inner tubes or nipples 32 are cylindrical pre-formed steel tubes having an outer diameter of a size to fit snugly within the ends of outer tube 10. The tubes 32 are internally threaded along a portion of their lengths for receiving thimbles or throat tubes 33 which are screwed into the tubes 32 for abutting sealing rings 37 at the inner ends of the tubes 32 and forcing the rings against the ball 28. Slots 35 are preferably provided at intervals around the inner surface of the thimbles 33 for engaging a spanner wrench and the like.

After the inner tubes 32 are inserted substantially in the positions shown in Fig. 1, the sealing rings 37 are inserted within the inner ends of said tubes and in abutment with opposite ends of the ball 28. These rings 37 may be of nylon or similar synthetic material having some resiliency and allowing the ball to turn easily while bearing on the rings. Preferably, the rings fit within cylindrical surfaces 38 behind annular shoulders 39 at the inner ends of tubes 32. Each ring has an annular shoulder 40 spaced behind the shoulder 39 when the ring has its inner spherical surface 41 seated on the ball. An O-ring seal 42 is provided between shoulders 39 and 40. Between the outer face of each ring 37 and the inner end of adjacent tube 33 is a wavy spring steel washer 43 abutting against a nylon washer 44, and the ring 37 has a lip portion 45 extending over the radially inner edges of said washers to keep out dirt and foreign matter.

The sealing rings 37 are resiliently pressed against the ball by screwing the thimble tubes 33 inward against the rings to adjust the amount of compression on the spring washers 43. Next, the bores of the tubes 33 are accurately aligned with the opening 30 of the ball. The tubes 33 may be held temporarily in aligned position by clamping the tubes 32 inwardly against the ball in a clamping jig consisting of two plates held in abutment with the outer ends of tubes 32 by a bolt extending axially through the ball opening 30. While thus held in aligned position the tubes 32 may be welded to the ends of the outer tube 10 by annular weldments 47A and 47B.

In order that the heat from the welding operation does not warp the valve ports or damage the sealing rings, it is preferred to first temporarily weld at 47A and 47B by tack welding or laying down a small bead of weld metal sufficient to close the joint. Water or other cooling medium can then be circulated, by means of the connections 48, through the annular chamber C around the ball and between the inner ends of tubes 32 while the welds are completed. Of course, to meet certain conditions it may be desirable to substitute threaded joints with O-ring seals for the welded joints 47A and 47B.

After the welding operation is complete, the clamping jig is removed, and the ball valve is ready to be welded into a pipe line, as indicated by the weldments 49A and 49B connecting the tubes 32 to pipe line sections 50A and 50B. As shown, the outer end portions of the tubes 32 may also be provided with external threads on which standard ring flanges may be screwed if flanged connections with the pipe line are desired.

When the valve is in service an operator for turning the valve may be mounted on the mounting flange 19. Lubricant may be supplied through the axial bore 12' to fill the chamber C around the ball.

The sealing rings 37 provide resilient seals around opposite ends of the ball, and the amount of sealing pressure against the ball may be adjusted by turning the thimble tubes 33. The nylon material is sufficiently elastic to expand radially outward under the thrust of the ball into seating abutment with the surfaces 38 in the ends of inner tubes 32. The floating mounting of the ball on the inner end of the valve stem 12, allows the ball in closed position to be self-seating and to distribute the pressure from the upstream side uniformly over the resilient sealing ring which takes the pressure of the ball on the downstream side.

In both the open and closed positions of the ball the O-rings 42 in the sealing ring construction seal off pressure from either direction, that is, from escaping from the pipe into chamber C or from chamber C into the pipe line. By having the O-rings 42 at the outer annular surface of the seals, the pressure from within the pipe line on the upstream side can enter through the washers 43 and 44 and get behind the O-ring, thus more effectively seating the ring against the ball to seal off pressure from the pipe line when the ball is in either open or closed position. The nylon washers 44 provide additional sealing means around the ball on the downstream side if the O-ring seal should become ineffective. As a result of the sealing ring construction, the pressure in chamber C can be drawn off at any time to permit inspection of the ball and add lubricant around the ball.

The construction of Fig. 1 provides for inspecting and replacing the sealing rings 37 by first removing the valve from the line. If the valve is welded into the pipe line it is removed by cutting the weldments 49A and 49B. The sealing rings 37 and O-rings 42 can then be removed by unscrewing the throat tubes 33.

In the modified construction of Fig. 3, the two inner tubes indicated at 32 in Fig. 1 are replaced by inwardly tapered tubes 52 which may be conventional swaged nipples of a standard size adapted to telescope within the outer ends of center tube 10′ with the outer cylindrical ends 53 of the nipples projecting from the ends of tube 10′. The telescoped inner portions of the nipples are spaced radially inward of tube 10′ and form an annular chamber C′ within tube 10′ and surrounding the ball 28.

The sealing rings 54 in this embodiment are fitted on the inner ends of nipples 52 before the nipples are inserted in tube 10′, and after the nipples are inserted they are aligned with the opening 30 in the ball and then clamped against the ball by a clamping jig similar to the one described in connection with Fig. 1. In this case the pressure on the seals is adjusted and maintained by the jig while the nipples 52 are welded to the ends of tube 10′ by weldments 55A and 55B. As in the case of Fig. 1, the outer tube has pipe connections 48 leading into the chamber C′ for circulating a coolant therein during the welding operations, and chamber C′ may be subsequently evacuated and filled with lubricant.

The sealing rings 54 may be of nylon and have annular grooves on their outer faces for receiving tongues 56 on the inner ends of the nipples 52. O-rings 57 are preferably provided between the tongues and grooves to insure tight seals in both directions, and resilient washers 58 are interposed between the rings 54 and the nipples 52. Inner lips 59 on the rings protect the washers from dirt and the like. In this embodiment, it is necessary to cut one of the welded joints 55A or 55B in order to remove an inner tube and the seal mounted on the end thereof, in which case the ball may be turned to closed position and removed through the end of tube 10′.

The modified seal construction shown in Fig. 5 is adapted to be used with the swaged nipples 52 of Fig. 3. The sealing ring 60 is of nylon or similar synthetic material and has an annular groove 61 on its outer face which receives the tongue 62 on the inner end of the nipple, and a spring washer 63 is interposed between the ring and nipple radially inward of the tongue, and inside lip 60′ protecting the washer.

The ring 60 does not have an O-ring and seals off pressure on the downstream side only of the ball. When the ball is in closed position the pressure on the ball compresses the spring 63 on the downstream side, thus compressing the nylon as a gasket between the ball and the nipple 52 forming the throat of the valve.

The modified seal construction shown in Fig. 6 is also adapted to be used with the swaged nipples 52 of Fig. 3. The sealing ring 64 is of metal and has an annular lubricant groove 65 on its seating face. This groove may be supplied with a soap-like lubricant under pressure by a flexible tube in a manner to be described in connection with Fig. 8, to maintain a highly efficient seal between the ball and the ring. A spring washer 66 is interposed between the outer face of ring 64 and the nipple 52, and the radially inner lip portion 67 of the ring extends outwardly within the nipple. An O-ring 68 is provided between the nipple and lip portion 67 of the ring.

Figure 8:
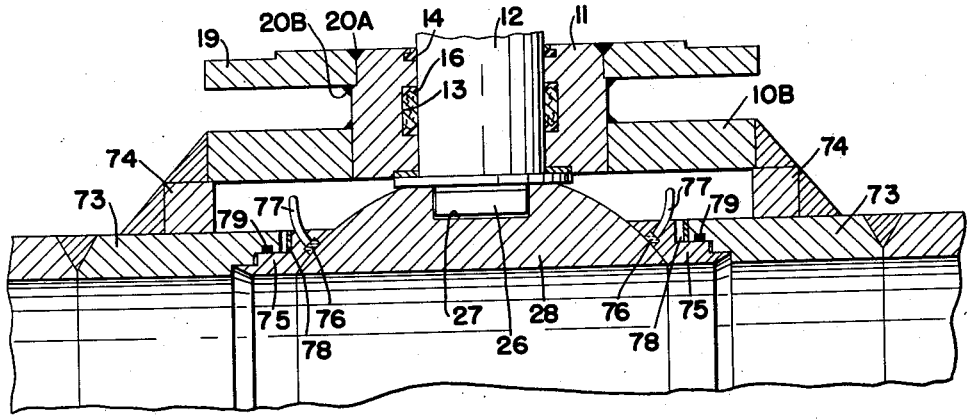
Fig. 8 is still another modified ball valve construction shown with the sealing construction of Fig. 7.

In the modified ball valve constructions of Figs. 7 and 8, the ball has a full port opening; that is, the size of the opening through the ball is the same as the bore of the pipe line in which the valve is mounted. In both constructions the valve stem 12 of the valve is journaled in a side tube 11 mounted in the outer tube coaxial with the flow line of the valve, and the axis of the stem is at right angles to and intersects the flow line. The ball 28 is slidably keyed to the stem for movement longitudinally of the valve in the closed position of the ball.

In both constructions the outer tube is spaced radially outward of the inner tubes carrying the sealing rings, so that when the inner tubes are telescoped in and arranged concentrically of the outer tube, an annular chamber will be formed within the outer tube and around the ball. The inner tubes 70 in Fig. 7 are pre-formed cylindrical tubes which are radially spaced from and connected to the outer ends of the outer tube 10A by conical spacer rings 71 welded at their ends to the outer ring and inner rings, respectively. The inner tubes 73 in Fig. 8 are pre-formed cylindrical tubes connected to the outer ends of the outer tube 10B by spacer rings 74 of rectangular cross section and welded to the outer ring and inner rings, respectively.

The sealing rings 75 are substantially the same in both forms and are preferably of metal with an annular lubricant groove 76 similar to the sealing ring construction shown in Fig. 6. The soap-like lubricant for groove 76 may be supplied through flexible tubes 77 as shown in Fig. 8 which connect with ducts through the wall of outer tube 10B to large lubricant fittings for forcing the lubricant into the groove under tremendous pressure. Spring washers 78 are interposed between the outer faces of the sealing rings 70 and 73 to hold the rings against the ball under yielding pressure. Also O-rings 79 are provided between cylindrical abutting surfaces of the rings and inner tubes, respectively.

In fabricating the valve constructions of Figs. 7 and 8, after the ball is slid onto the stem within the outer tube, the ball is turned to open position and the inner tubes with the sealing rings 75 on their inner ends are positioned against opposite ends of the ball. The inner tubes are then clamped in position aligned with the ball opening, and the spacer rings temporarily welded to enclose the annular chamber formed around the ball between the outer and inner tubes. The outer tubes are provided with pipe connections at 48 through which a cooling medium may be circulated while making the final weld. The inner diameters of the tubes 70 or 73 and the rings 75 are exactly coextensive with the opening 30 of the ball in open position, so that a through opening of constant diameter is formed through the valve and pipe line.

The forms of Figs. 7 and 8 require cutting of at least one of the welds between the outer and inner tubes, in order to remove an inner tube and the seal mounted on the end thereof, as is the case with the form of Fig. 3. However, in the case of any valve welded into a pipe line, it is necessary to cut a weld to remove the valve from the line for maintenance or repair, and the cutting of an additional weld is a minor consideration in view of the many apparent advantages of a lightweight, economical and strong valve constructed of pre-formed tubes as compared with a conventional valve having a cast or forged body.

The improved ball valve construction is simple and easily fabricated out of standard pre-formed steel tubes. It requires no detachable means for assembling, inserting or removing the ball, or bodily moving it sidewise of the valve. It provides for accurate alignment during fabrication of the valve port and embodies an outer chamber around a floating or self-seating ball with rings resiliently seated on opposite ends for sealing off pressure in both directions between the outer chamber and the flow line.

What is claimed is:

1. A ball valve having a body constructed of pre-formed metal tubes permanently joined together, comprising an outer tube having a bore through its wall and said tube being coaxial with the flow line of the valve, a sealing gland tube of smaller inner diameter than said outer tube secured thereon at right angles thereto and coaxial with said bore, a valve stem journaled in said sealing gland tube coaxial therewith and projecting inwardly of said outer tube, aligned inner tubes partly telescoped within and permanently joined to opposite ends of said outer tube, a ball shut-off larger than the inner diameter of the sealing gland tube and having a through opening keyed on the projecting end of said stem for sliding axially of said outer tube with the ball in closed position, said through opening being aligned with said inner tubes with the ball in open position, and sealing means between the inner ends of said inner tubes and said ball shut-off, said inner tubes forming an annular chamber around the ball between said seals and the outer tube.

2. A ball valve having a body constructed of preformed metal tubes permanently joined together, comprising an outer tube having a bore through its wall and said tube being coaxial with the flow line of the valve, a side tube of smaller inner diameter than said outer tube secured thereon at right angles thereto and coaxial with said bore, a valve stem journaled in said side tube coaxial therewith and projecting inwardly of said outer tube, a seal between said side tube and stem, aligned inner tubes telescoped within and permanently joined to opposite ends of said outer tube, a ball shut-off larger than the inner diameter of the side tube keyed on the projecting end of said stem for sliding axially of said outer tube with the ball in closed position, said ball having a through opening aligned with said inner tubes when the ball is in open position, and sealing means between said ball shut-off and the inner ends of said inner tubes, said inner tubes forming an angular chamber around the ball between said seals and the outer tube.

3. A ball valve having a body constructed of preformed metal tubes permanently joined together, comprising an outer tube having a bore through its wall and said tube being coaxial with the flow line of the valve, a sealing gland tube of smaller inner diameter than the outer tube permanently joined to said outer tube at right angles thereto and coaxial with said bore, a valve stem journaled in said sealing gland tube coaxial therewith and projecting inwardly of said outer tube, aligned inner tubes partly telescoped within and permanently joined to opposite ends of said outer tube, a ball shut-off larger than the inner diameter of the sealing gland tube having a through opening keyed on the projecting end of said stem for sliding axially of said outer tube with the ball in closed position, said through opening being aligned with said inner tubes with the ball in open position, and resilient ring seals between the inner ends of said inner tubes and said ball shut-off.

4. A ball valve having a body constructed of preformed metal tubes permanently joined together, comprising an outer tube having a bore through its wall and said tube being coaxial with the flow line of the valve, a side tube of smaller inner diameter than the outer tube permanently joined to said outer tube at right angles thereto and coaxial with said bore, a valve stem journaled in said side tube coaxial therewith and projecting inwardly of said outer tube, a seal between said side tube and stem, aligned inner tubes telescoped within and permanently joined to opposite ends of said outer tube, a ball shut-off larger than the inner diameter of the side tube keyed on the projecting end of said stem for sliding axially of said outer tube with the ball in closed position, said ball having a through opening aligned with said inner tubes when the ball is in open position, and resilient ring seals between said ball shut-off and the inner ends of said inner tubes.

5. A ball valve having a body constructed of preformed metal tubes, comprising an outer tube having a bore through its wall and said tube being coaxial with the flow line of the valve, a side tube of smaller inner diameter than the outer tube on said outer tube at right angles thereto and coaxial with said bore, a valve stem journaled in said side tube coaxial therewith and projecting inwardly of said outer tube, a seal between said side tube and stem, aligned inner tubes telescoped within and secured to opposite ends of said outer tube, a ball shut-off larger than the inner diameter of the side tube keyed on the projecting end of said stem for sliding axially of said outer tube with the ball in closed position, said ball having a through opening aligned with said inner tubes when the ball is in open position, sealing rings between the inner ends of said inner tubes and the ball, and spring means yieldingly pressing said sealing rings against the ball, said inner tubes forming an annular chamber around the ball between said sealing rings and said outer tube.

6. A ball valve having a body constructed of preformed metal tubes permanently joined together comprising an outer tube having a bore through its wall and said tube being coaxial with the flow line of the valve, a side tube of smaller inner diameter than the outer tube permanently joined to said outer tube at right angles thereto and coaxial with said bore, a valve stem journaled in said side tube coaxial therewith and projecting inwardly of said outer tube, a seal between said side tube and stem, aligned tapered inner tubes having their small ends telescoped within and spaced radially inward of said outer tube and their large ends permanently joined to opposite ends thereof, a ball shut-off larger than the inner diameter of the side tube keyed on the projecting end of said stem for sliding axially of said outer tube with the ball in closed position, said ball having a through opening aligned with said inner tubes when the ball is in open position, and ring seals held under pressure against said ball shut-off by abutment with the inner ends of said inner tubes, said inner tubes forming an annular chamber around the ball between said seals and the outer tube.

7. A ball valve having a body constructed of preformed metal tubes permanently joined together, comprising an outer tube having a bore through its wall and said tube being coaxial with the flow line of the valve, a side tube of smaller inner diameter than the outer tube permanently joined to said outer tube at right angles thereto and coaxial with said bore, a valve stem journaled in said side tube coaxial therewith and projecting inwardly of said outer tube, a seal between said side tube and stem, aligned inner tubes spaced radially inward of the opposite ends of said outer tube, spacer rings permanently joined between said inner tubes and opposite ends of said outer tube to form an annular chamber therebetween, a ball shut-off larger than the inner diameter of the side tube keyed on the projecting end of said stem for sliding axially of said outer tube with the ball in closed position, said ball having a through opening aligned with said inner tubes when the ball is in open position, and resilient ring seals mounted on the inner ends of said inner tubes and held under pressure by said inner tubes in abutment with said ball shut-off.

8. A ball valve having a body constructed of preformed metal tubes permanently joined together, comprising an outer tube having a bore through its wall and said tube being coaxial with the flow line of the valve, a side tube of smaller inner diameter than the outer tube on the outer tube at right angles thereto and coaxial with said bore, a valve stem journaled in said side tube coaxial therewith, aligned inner tubes telescoped within opposite ends of said outer tube and permanently joined thereto, a ball shut-off larger than the inner diameter of the side tube keyed on the inner end of said stem for sliding axially of said outer tube with the ball in closed position, said ball having a through opening aligned with said inner tubes when the ball is in open position, resilient sealing rings within the inner ends of said inner tubes, and thimble tubes screwed into said inner tubes and holding said sealing rings in abutment with said ball.

9. A ball valve having a body constructed of preformed metal tubes permanently joined together, comprising an outer tube having a bore through its wall and said tube being coaxial with the flow line of the valve, a side tube of smaller inner diameter than the outer tube on the outer tube at right angles thereto and coaxial with said bore, a valve stem journaled in said side tube coaxial therewith, aligned inner tubes telescoped within opposite ends of said outer tube and permanently joined thereto, a ball shut-off larger than the inner diameter of the side tube keyed on the inner end of said stem for sliding axially of said outer tube with the ball in closed position, said ball having a through opening aligned with said inner tubes when the ball is in open position, resilient sealing rings within the inner ends of said inner tubes, said inner tubes forming an annular chamber around the ball between said sealing rings and said outer tube, and thimble tubes screwed into said inner tubes and holding said sealing rings in abutment with said ball.

10. The method of fabricating a ball valve having a body constructed of pre-formed metal tubes welded together, which consists in perforating the wall of an outer tube and welding a side tube therein at right angles thereto, journaling a valve stem in said side tube coaxial therewith, inserting a tubular ball shut-off into said outer tube and slidably keying the ball onto the inner end of said stem with the ball in closed position, turning the ball to open position, providing two inner tubes for telescoping within opposite ends of said outer tube with the inner ends of said inner tubes spaced from said ball, applying sealing rings to the inner ends of said tubes, inserting said inner tubes into opposite ends of said outer tube with said sealing rings on the inner ends of said inner tubes, aligning said inner tubes with said ball in open position and clamping said tubes with the sealing rings held under compression against said ball, tack welding said inner tubes to said outer tube, circulating a coolant between the sealing rings and the outer tube, and finish welding said inner tubes to said outer tube.

References Cited in the file of this patent

UNITED STATES PATENTS

| | | |
|---|---|---|
| 676,526 | Anderson | June 18, 1901 |
| 982,815 | Hobbs | Jan. 13, 1911 |
| 1,370,224 | Redding | Mar. 1, 1921 |
| 1,784,381 | O'Stroske | Dec. 9, 1930 |
| 2,032,623 | Lewis | Mar. 3, 1936 |
| 2,516,947 | Blevans | Aug. 1, 1950 |
| 2,520,288 | Shand | Aug. 29, 1950 |
| 2,573,177 | Bohlen | Oct. 30, 1951 |
| 2,606,738 | Glen | Aug. 12, 1952 |
| 2,628,060 | Parker | Feb. 10, 1953 |
| 2,664,098 | McInerney | Dec. 29, 1953 |
| 2,677,876 | Juhnke | May 11, 1954 |
| 2,682,701 | Pote | July 6, 1954 |
| 2,734,715 | Knox | Feb. 14, 1956 |

FOREIGN PATENTS

| | | |
|---|---|---|
| 254,134 | Italy | July 13, 1927 |
| 1,010,678 | France | Mar. 26, 1952 |

UNITED STATES PATENT OFFICE

CERTIFICATE OF CORRECTION

Patent No. 2,890,017                                                                                  June 9, 1959

Homer J. Shafer

It is hereby certified that error appears in the printed specification of the above numbered patent requiring correction and that the said Letters Patent should read as corrected below.

Column 2, line 66, for "sealing land" read -- sealing gland --; column 3, line 5, for "of the tube 11" read -- to the tube 11 --; column 4, line 65, for "the pipe into chamber C" read -- the pipe line into chamber C --; column 7, line 33, for "an angular chamber" read -- an annular chamber --; column 10, line 14, list of references cited, under the heading "UNITED STATES PATENTS", for "Jan. 13, 1911" read -- Jan. 31, 1911 --.

Signed and sealed this 29th day of September 1959.

(SEAL)
Attest:

KARL H. AXLINE
Attesting Officer

ROBERT C. WATSON
Commissioner of Patents